United States Patent [19]

Edelson

[11] Patent Number: 4,591,897
[45] Date of Patent: May 27, 1986

[54] SYSTEM FOR GENERATING A DISPLAY OF GRAPHIC OBJECTS OVER A VIDEO CAMERA PICTURE

[76] Inventor: Steven D. Edelson, 7 Sears Rd., Wayland, Mass. 01778

[21] Appl. No.: 587,630

[22] Filed: Mar. 8, 1984

[51] Int. Cl.$^4$ ............................................. H04N 9/76
[52] U.S. Cl. ..................................... 358/22; 340/723; 340/728; 358/182
[58] Field of Search .......................... 358/22, 183, 182; 340/720, 723, 721, 725, 728, 734, 747

[56] References Cited

U.S. PATENT DOCUMENTS

| | | | |
|---|---|---|---|
| 3,941,925 | 3/1975 | Busch et al. | 178/6.8 |
| 4,482,893 | 11/1984 | Edelson | 340/723 |
| 4,488,169 | 12/1984 | Yamamoto | 358/22 |
| 4,533,937 | 8/1985 | Yamamoto | 358/22 |
| 4,533,952 | 8/1985 | Norman, III | 358/22 |

Primary Examiner—Michael A. Masinick
Attorney, Agent, or Firm—Lane and Aitken

[57] ABSTRACT

In a display system for generating a display of graphic objects over a video camera picture, the graphic objects to be displayed are represented by transition specifications stored in a memory. The transition specifications contain data identifying the horizontal position at the start of each transition between the camera picture and the graphic object, the width of the transition, the brightness in the graphic object, and a weight step value corresponding to the inverse of the width of the transition. As the electron beam of a cathode ray tube display device traverses a transition, a weighting value is continuously computed by changing the weighting value from the beginning value on one side to the final value on the other side in steps equal to weight step size. The computed weighting value is used to control the mixing of the video camera picture signal and a video signal representing the graphic objects in the transitions between the video camera picture and the graphic objects.

8 Claims, 6 Drawing Figures

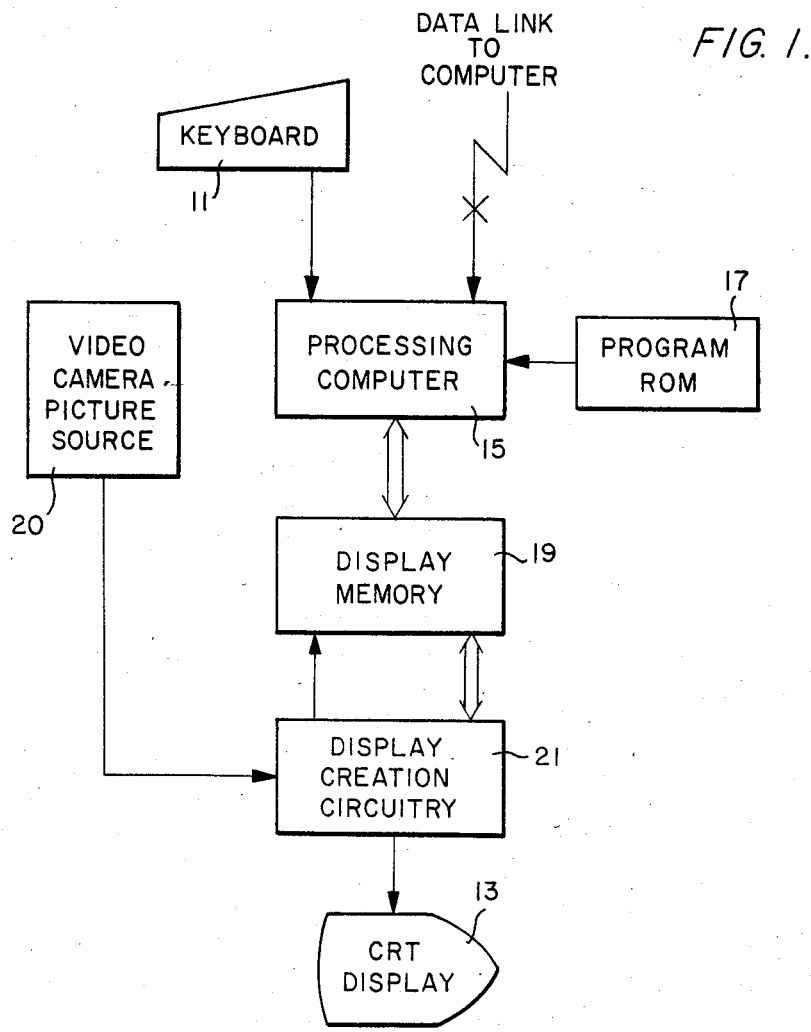

| 1 OBJECT NO. |
|---|
| 2 LEADING-TRAILING FLAG |
| 3 HORIZONTAL SCAN LINE NO. |
| 4 POSITION ON SCAN LINE |
| 5 ADDRESS OF NEXT TRANSITION |
| 6 STEP COUNT |
| 7 DEPTH LEVEL |
| 8r RED FINAL BRIGHTNESS |
| 8s GREEN FINAL BRIGHTNESS |
| 8b BLUE FINAL BRIGHTNESS |
| 9r RED STEP SIZE |
| 9s GREEN STEP SIZE |
| 9b BLUE STEP SIZE |
| 10       1 |
| 11       0 |
| 12       0 |

FIG. 3.

| 1 OBJECT NO. |
|---|
| 2 LEADING-TRAILING FLAG |
| 3 HORIZONTAL SCAN LINE NO. |
| 4 POSITION ON SCAN LINE |
| 5 ADDRESS OF NEXT TRANSITION |
| 6       0 |
| 7 DEPTH LEVEL |
| 8r RED OBJECT BRIGHTNESS |
| 8s GREEN OBJECT BRIGHTNESS |
| 8b BLUE OBJECT BRIGHTNESS |
| 9r       0 |
| 9s       0 |
| 9b       0 |
| 10 FINAL WEIGHTING VALUE |
| 11 WEIGHTING STEP SIZE |
| 12 STEP COUNT |

SYSTEM FOR GENERATING A DISPLAY OF GRAPHIC OBJECTS OVER A VIDEO CAMERA PICTURE

BACKGROUND OF THE INVENTION

This invention relates to an improved system for displaying graphic objects over or in conjunction with a video motion picture such as produced from the video signal generated by a video camera. The term "motion picture" is intended to include live television camera pictures as well as those recorded by video recorders or on film.

In U.S. Pat. No. 4,482,893, entitled Cathode Ray Tube Display With Minimized Distortion From Aliasing, filed by the inventor of this application on Feb. 19, 1982, there is disclosed an improved system for displaying graphical objects in a Cathode Ray Tube Display System employing a television type raster scan. The system improves the display of the graphic objects by minimizing distortion caused by aliasing. In accordance with the invention the displayed graphic objects are produced on a constant background color and brightness and the graphic objects are defined in the terms of the transition of the raster scan lines across the edges of the objects. The width of each transition is varied in accordance with the slope that the edge of the graphic object being displayed makes with the horizontal scan line and the brightness of each color is stepped from the starting brightness to the final brightness across each transition representing an edge. However, when the background is not a solid brightness but is instead a varied, textured scene, as would be produced by a TV camera, the calculations of the brightness increments along the transition becomes quite complex. If the background is a motion picture so that the scene is changing with time, the calculation of intermediate transition shades would exceed the capability of current computer hardware.

In large budget commercials, which are prerecorded frame by frame, graphic objects can be produced with smooth sharp edges over a camera picture by a tedious and expensive process. However the use of such a process is impossible in producing graphic objects over a live television picture and is impractical in low budget commercials. The common solution to the problem of generating graphic objects over a camera picture is to use a pixel-based switcher (or keyer), which makes a graphic/camera picture decision on a pixel by pixel basis. Each pixel is either 100% graphics or 100% camera picture signal. In this manner, an inexpensive mixing of graphics and camera picture is achieved. The disadvantage of this system is that edge of the displayed graphic objects have jagged artifacts. These switching artifacts, which are annoying to the viewer, appear as jagged edges within the graphic object shape. This is why when graphic objects such as alphanumeric characters are superimposed over live video pictures, as is frequently done in the videocasting of sporting events, the alphanumeric characters appear with jagged rather than smooth edges. Even if the computer graphics system were able to produce perfectly smooth graphic objects, the switcher system would nevertheless reintroduce a jaggedness around the periphery where the transition from a video camera signal to the graphic signal occurs. Currently there are some systems which try to minimize the effect by blurring the edges between the graphics and the camera picture, but these systems have the undesirable side effect of making the graphic objects look blurred.

SUMMARY OF THE INVENTION

The present invention provides a technique used in conjunction with the technique in the above-mentioned copending application, to achieve both smooth graphic object shapes and a method of mixing these smooth graphic shapes with the video camera picture in a manner which preserves a smooth, visually pleasing edge at the boundry between the video camera picture and the graphic object. This pleasing effect is achieved both with graphic objects which are opaque and with objects which are partially transparent so that the camera picture can be seen through the graphic objects.

In accordance with the present invention, the graphic objects to be displayed over a video camera picture are represented by transition specifications stored in a graphics memory similar to the manner disclosed in the above-mentioned copending application. Each transition specification representing a transition to or from a video camera picture will contain data identifying the horizontal position at the start of the transition in the horizontal scan line, the width of the transition, the brightness of each video color in the graphic object, and a weight step value which is determined by the inverse of the width of the transition. As the electron beam of the horizontal cathode ray tube traverses a transition between a camera video picture and a graphic object, a weighting value is continuously computed by changing the weighting value from the beginning value on one side to the final value on the other side in increments equal to the weight step size. When the transition specification is from a fully unobscured camera picture to a graphic object, the beginning weighting value will be zero and the final weighting value will be a number between zero and one representing an opacity weighting factor of the graphic object. When the transition is from the graphic object to a fully unobscured camera picture, the beginning weighting value will be the opacity weighting factor and the final weighting value will be zero. The opacity weighting factor indicates the degree of opacity of the graphic object on a scale of zero to one, with one representing fully opaque and zero representing transparent. In the usual case, the graphic object will be fully opaque and the opacity weighting factor of the object will be one. In those instances, when it is desired to show the camera picture through a translucent graphic object, the opacity weighting factor for the graphic object will be less than one.

The computed weighting value is multiplied times the video color brightness values for the objects and the complement of the weighting value is multiplied times the brightness of the video image. The two products resulting from this multiplication are added together to produce the video signal brightness values in the transition.

In the above described manner smooth high quality transitions between a camera picture and graphic objects or characters are provided with minimized distortion caused by aliasing.

Accordingly, an object of the present invention is to provide a simplified system for providing improved graphics over a video camera picture. A further object of the present invention is to provide such an improved graphics system over a video camera picture in which the video graphics may be translucent.

Further objects and advantages of the present invention will become readily apparent as the following detailed description of the invention unfolds, and when taken in conjunction with the drawings.

BRIEF DESCRIPTION OF THE DRAWINGS

FIG. 1 is a block diagram illustrating the system of the present invention.

FIGS. 2 and 3 schematically represent transition specifications, which are blocks of data employed in the system of the present invention.

DESCRIPTION OF THE PREFERRED EMBODIMENTS

Figure 4:
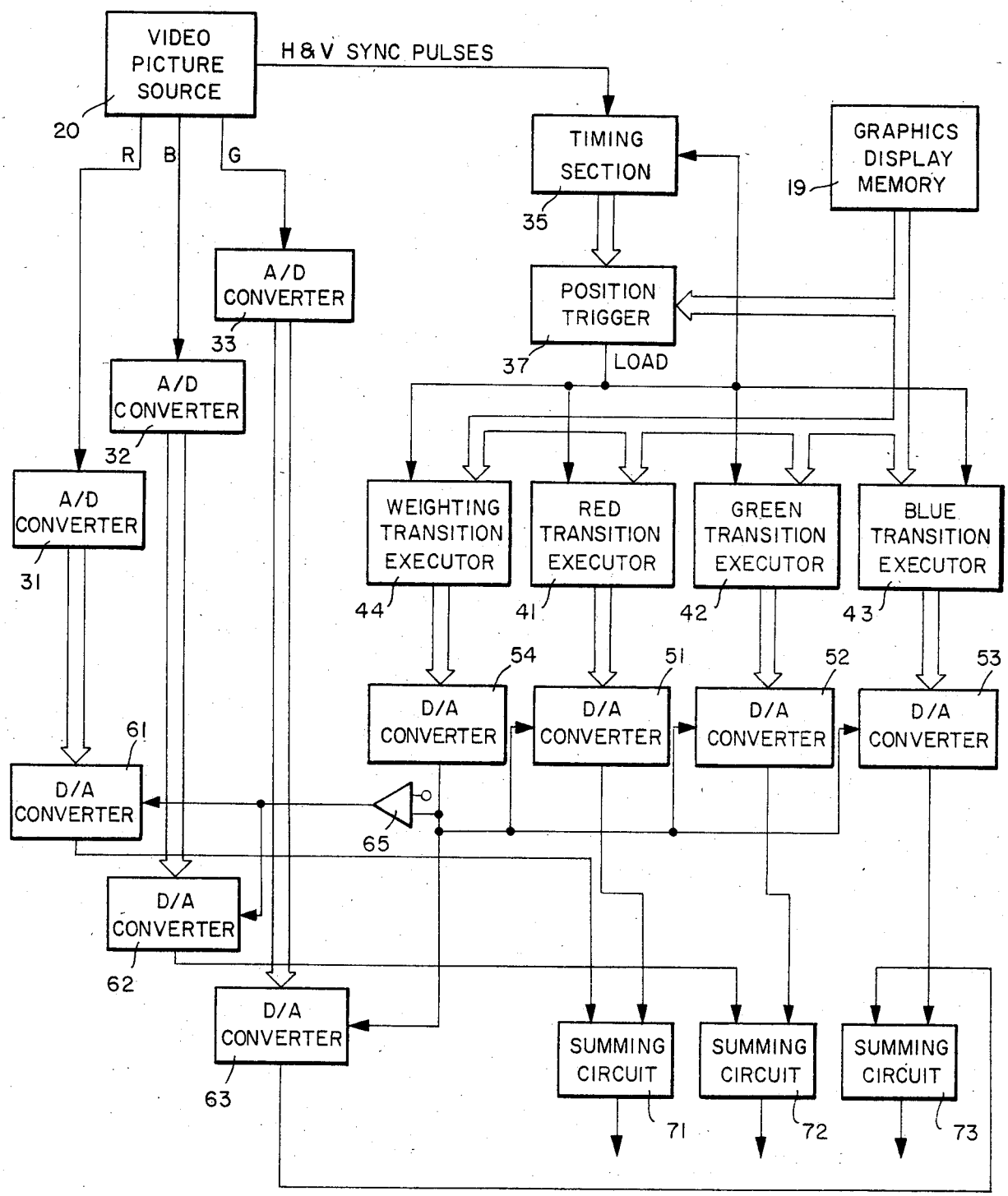
FIG. 4 is a block diagram illustrating the display creation circuitry block of FIG. 1 in more detail.

As shown in FIG. 1, the system of the present invention comprises a keyboard 11 for entering data representing objects to be displayed on a color video cathode ray tube display device 13. The information entered by the keyboard is received by a processing computer 15, which under the control of the program stored in a program rom 17 computes from the data entered by the keyboard a series of transition specifications which are stored in a display memory 19. A video camera motion picture source 20 generates color video signals representing a color video camera motion picture and applies the video signals to display control circuitry 21. The display control circuitry 21 reads out the transition specifications stored in the display memory 19 and converts the data from the specifications into video signals corresponding to the graphic objects represented by the transition specifications. The display creation circuitry 21 combines the video signals converted from the transition specifications with the video signals received from the video camera picture source to produce resultant color video signals, which are applied to a color video cathode ray display device 13. The cathode ray display device 13 scans electron beams across the screen of its cathode ray tube in a conventional TV raster scan and will display images in response to applied color video signals in the manner of a conventional color TV receiver. When the resultant signals produced by the display circuitry 21 are applied to the display device 13, the display device 13 will display the motion picture represented by the video signals produced by the video camera motion picture source 20 with the graphic symbols represented by the transition specifications stored in the display memory 19 superimposed on the video camera motion picture.

The computer 15, in addition to computing and storing the transition specifications in response to entrys by the keyboard 11, may also compute and store the transition specifications to represent graphic objects or characters in display memory 19 in response to signals received via a data link from another computer. The video signals generated by the display creation circuitry may be applied to a television transmitter for VHF or UHF transmission to color television receivers.

The transition specifications stored in the display memory 19 represent the objects to be displayed in terms of the location where the raster scan lines of the display device 13 cross the edges of the objects to be displayed. Each time a horizontal scan line crosses the edge of the graphic object to be displayed, there will be a transition in the video signals from the brightness levels prior to the edge to the brightness levels after the edge. Thus the crossing of graphic object or character edges by the horizontal scan lines are referred to as transitions. The transition specifications stored in the display memory provide all the information about each of the transitions necessary for the display control circuitry 21 to generate video signals representing the graphic objects and which when combined with the video signals from a video camera picture source 20 will cause the cathode ray device 13 to display a picture represented by the video signals from the camera source 20 with the graphic objects superimposed over the picture.

The transition specifications are similar to those disclosed in the U.S. Pat. No. 4,482,893 and contain information as to the location of each transition, and information as to the character of the transition in terms of the width of the transition and the rate of change in brightness of the color across the transition. As explained in the above mentioned copending application, to reduce aliasing distortion, each transition is considered to have a width which depends upon the angle that the object edge has with the horizontal scan line at the transition. Specifically, the width of the transition is made approximatley proportional to the cotangent of the angle that the horizontal scan line makes with the edge at the transition.

As in a conventional TV display the number of horizontal scan lines is 525. The display control circuitry 15 divides the horizontal scan line into 4096 divisions, of which about 3,400 divisions are in the visible part of the scan line. In accordance with the preferred embodiment of the invention, as in the above-mentioned copending application, the width of each transition is made equal to about $8/\tan\theta$ divisions, in which $\theta$ is the angle that the horizontal scan line makes with the edge defining the transition. The brightness of each of the 3 video colors is caused by the display creation circuitry to change in steps distributed across the width of the transition from the initial brightness level at the start of the transition to the final brightness level at the end of the transition.

The transition specifications are organized into 16 memory slots, each capable of storing binary words. FIG. 2 schematically illustrates a transition specification representing a transition between opaque graphic objects and FIG. 3 schematically illustrates a transition specification representing a transition between a graphic object and a camera picture unobscured by any translucent graphic object. As shown in FIGS. 2 and 3, each transition specification has 16 memory slots, numbered 1 through 7, 8r, 8g, 8b, 9r, 9g, and 9b, and 10 through 12.

The transition specification representing transitions between opaque graphic objects, as shown in FIG. 2, will contain the following data in its memory slots:

Slot 1: A number identifying the graphic object or character the edge of which is represented by the transition;

Slot 2: A flag indicating whether the transition is a leading edge or a trailing edge, a leading edge being a point where the horizontal scan line crosses into the object and the trailing edge being where the horizontal scan line crosses out of the object;

Slot 3: a number identifying the horizontal scan line at which the transition occurs;

Slot 4: A number identifying the position of the start of the transition in horizontal scan line divisions;

Slot 5: The address in the display memory 19 of the next transition specification to be encountered in the raster scan (this address is referred to as the linking address and the list of linking addresses is referred to as a linked list);

Slot 6: The step count, which is equal to the width of the transition in horizontal scan line divisions;

Slot 7: A number identifying the depth level of the object causing the transition;

Slots 8r, 8g, and 8b: The final brightness to which the video colors red, green and blue, respectively, are to be changed at the transition;

Slots 9r, 9g, and 9b: The step size for each video color in the transition (the step size is the average amount that the brightness is changed per horizontal division);

Slot 10: The value 1;

Slot 11: The value 0; and

Slot 12: The value 0.

The data in slots 1 through 9 is the same data that constitutes a transition specification in the above-mentioned U.S. Pat. No. 4,482,893 and as will be seen the system operates to display a transition from one graphic object to another in response to this type of transition specification essentially in the same manner as is done in the above patent.

A transition specification representing a transition between a fully unobscured camera picture and a graphic object, illustrated in FIG. 3, will each contain in slots 1 through 5 and 7 the identical data that is found in these memory slots in a transition specification representing a transition between opaque graphic objects. Each transition specification of the type shown in FIG. 3 will contain in memory slot number 6 and in memory slots 9r, 9g, and 9b the number zero for reasons which will become apparent from the description below. A leading edge transition specification representing a transition from a camera picture to a graphic object will contain in slots 8r, 8g, and 8b the final brightness values to which the video colors are to be changed. In a trailing edge transition specification, representing a transition from a graphic object to a fully unobscured camera picture, the values stored in slots 8r, 8g and 8b will be the color brightness values for the graphic object from which the transition is taking place. Each transition specification involving a camera picture will have stored in slot number 10 a final weighting value, and in slot number 11 a weight step size. The weighting value represents graphic object opacity on a scale of zero to one, with zero representing completely transparent and one representing completely opaque. The final weighting value in slot 10 for a leading edge transition specification (from a camera picture) will be a weighting value corresponding to the opacity of the graphic object and will be one if the graphic object is opaque. Similarly, in a trailing edge transition specification, to fully unobscured video camera picture, the final weighting value will be zero to represent fully transparent. The weighting step size (value) stored memory slot 11 will be a number equal to the difference between the beginning weighting value at the transition and the final weighting value at the transition divided by the width of the transition in a horizontal scan line divisions. The beginning weighting value represents the opacity of the graphic object, if any, at the start of the transition. For a transition from a fully unobscured camera picture to a graphic object, the beginning weighting value will be zero representing fully transparent. For a transition from a graphic object to a camera picture, the beginning weighting value will correspond to the opacity of the graphic object. The beginning weighting value is not stored in the transition specification but it is used in computing the step size stored in slot 11 as explained above. The weighting step size represents average amount that object opacity is caused to change per horizontal scan line division in the transition. In memory slot 12 will be the step count which will be identical to the step count stored in memory slot 6 in a transition specification representing a transition between opaque graphic objects and which will be equal to the width of the transition in horizontal scan line divisions.

As in the above-identified U.S. Pat. No. 4,482,893, the display control 21 will use the transition specifications stored in the display memory 19 to generate a video signal which will cause the display device 13 to display the graphic objects represented by the transition specifications. The video signal of each color is caused to undergo a transition in brightness in response to each transition specification from a starting value to a final value across the width of the transition in steps. The starting point of each transition is determined by the numbers stored in memory slots 3 and 4 identifying the horizontal scan line on which the transition occurs and the point on the horizontal scan line where the transition starts. If the transition specification represents a transition between opaque graphic objects the width of the transition will be determined by the step count stored in memory slot 6. If the transition represents a transition involving a fully unobscured camera picture, the width of the transition will be determined by the step count stored in memory slot 12. If the transition is between opaque graphic objects, then the size of each step change in brightness of the video signal from each color is determined by the corresponding step size values stored in memory slots 9r, 9g, and 9b, the value stored in 9r determining the step size for the red video signal, the value stored in slot 9g determining the intensities step size for the green video signal and the value stored in memory slot 9b determining the intensity step size for the blue video signal.

In the case of a transition specification involving a fully unobscured camera picture, each color video signal is caused to undergo a change in incremental steps between the video signal representing the camera picture and the graphic object in accordance with the final weighting value, weight step size and the step count stored in memory slots 10, 11 and 12. The display creation circuitry 21 continuously determines and changes the weighting value in steps across the width of the transition from the beginning weighting value to the final weighting value. This continuously determined weighting value is then used to control the mixing of the video camera video signals with the corresponding graphics video signals. The graphics video signals are multiplied by the value of the continuously determined weighting value and the camera video signals are multiplied by the complement of the weighting value. The resulting products for each video color are summed together to produce resulting video signals, which are used to control the cathode ray display. In this manner, the video signal for each video color is caused to change between the camera video signal and the graphic video signal incrementally across the width of the transition.

The display memory 19 is essentially the same as that disclosed in the above-mentioned U.S. Pat. No. 4,482,893 and accordingly will not be described in detail. As disclosed in the above-mentioned application, the display memory presents each transition specification in the order that it occurs in the horizontal raster scan to the display creation circuitry 21 the display memory 19 uses the linking addresses in memory slots 5 to read the transition specifications out in the sequence they occur.

The display control circuitry 21 is illustrated in more detail in FIG. 4. As shown in FIG. 4, the red, green and blue video camera signals from the video picture source are applied to analog-to-digital (A to D) converters 31 through 33 respectively, which continuously generate digital values representing these video signals. The horizontal and vertical sync pulses from the video picture source 20 are applied to a timing section 35, which from these pulses continuously generates a binary signal representing the current scan line of the raster scan for the video signals being generated by video picture source 20 and the horizontal position in horizontal scan line divisions for the video signals of the video picture source. These binary signals are applied to a position trigger 37, which also receives the values in memory slots 3 and 4 of the transition specification currently being read out of the graphics display memory and representing the next transition to be generated. As indicated above, the values in slots 3 and 4 of the transition specification will indicate the point in the raster scan where the transition is to start. The graphics display memory 19 also applies to the red transition executor, the green transition executor, and the blue transition executor, the value in memory slot 6 of the transition specification of the next transition to be generated. The value in slot 6 will be the step count or the width of the transition in a transition specification involving only opaque graphic objects and will be zero in the case of a transition specification involving a camera picture. The graphics display memory 19 applies the values in slots 8r, 8g and 8b of the currently read out transition specification to the red, green, and blue transition executors 41 through 43 respectively, and similarly applies the values in slots 9r, 9g, and 9b to the red, green, and blue transition executors 41 through 43.

The position trigger 37 compares the horizontal scan line and horizontal position values applied from the graphics display memory 19, to the values received from the timing section 35 and when they are the same indicating that the raster scan for the video signals produced by the video picture source is at the start of the transition, represented by the currently read out transition specification, the position trigger 37 will generate a load pulse and apply this pulse to the transition exeuctors 41 through 43 as well as to a weighting transition executor 44. In response to this load pulse, the transition executors 41 through 43 will load into a counter the value in memory slot 6. As explained above in the case of a transition specification involving only opaque objects, this will be the step count and the transition executors 41 through 43 will then proceed to generate the transition in response to the data applied by the graphics display memory 19 in the same manner as described in the above-mentioned U.S. Pat. No. 4,482,893.

The graphics display memory 19 will apply to the weighting transition executor 44 the data in memory slots 10 through 12 of the transition specification currently being read out. When the load pulse is produced by the position trigger 37, it will cause the step count in memory slot 12 to be loaded into a counter in the weighting transition executor 44. The weighting transition executor 44 in response to the step count be loaded into the executor 44 will then begin computing the weighting value across the transition. This is done by increasing the weighting value by the weight step size at each horizontal division across the weighting value starting with the beginning weighting value, which will be the final weighting value from the previous transition and ending with the final weighting value applied from the graphics display memory 19. Thus in the case of a transition specification involving a camera picture, the output of the weighting transition executor 44 will change in steps across the transition from the beginning weighting value to the final weighting value.

When a transition specification represents transition from one opaque graphic object to another, the final weighting value from the previously executed transition specification would have been a numerical value of one. Accordingly the output value from the weighting transition executor 44 at the start of the execution of such a transition specification will be one. The weighting transition executor 44 in response to the zero values in memory slots 11 and 12 and in response to a numerial value of one in memory slot 10, will maintain its output value at one throughout the execution of a transition specification representing a transition from one opaque graphic object to another.

As explained above, in a transition specification involving a fully unobscured camera picture, the value stored in memory slot 6 in place of the step count will be zero. The red, green, and blue transition executors 41 through 43, in response to receiving this value zero from the current transition specification being read out from the graphics display memory 19, will immediately switch their output binary values to the values stored in memory slots 8r, 8g, and 8b and hold them at these values throughout the execution of the transition specification and thereafter until the next transition specification is executed. Thus in the case of a transition specification involving a fully unobscured camera picture, the output values of the red, green, and blue transition executors will be switched at the start of the transition to represent the brightness of the graphic object to or from which the transition is going. If the transition is from a camera picture to the graphic object, then the outputs of the transition executors will be switched at the start of the transition to the brightness of the object to which the transition is going, and if the transition is from a graphic object to a camera picture, then the outputs of the transition executors 41 through 43 is maintained at the brightness of the graphics object from which the transition is exiting throughout the width of the transition.

The outputs from the color video transition executors 41 through 43 and the weighting transition excutor 44 are digital values and these digital values are applied to digital-to-analog converters 51 through 54, respectively. The digital-to-analog converter 54 converts the applied digital value from the weighting transition executor 44 to an analog signal, which is applied to a control input to each one of the digital-to-analog converters 51 through 53. The digital output of the weighting transition executor 44 will be of value ranging from zero to one and accordingly the analog signal output of the digital-to-analog converter 54 will represent a value from zero to one inclusive. The output signal of the digital-to-analog converter 54 is applied to each of the digital-to-analog converters 51 through 53. Each of the converters 51 through 53 will produce an analog output representing the applied digital value from the corresponding transition executor 41 through 43 multiplied by the value represented by the analog signal applied by the digital-to-analog converter 54.

The outputs of the analog-to-digital converters 31, 32, and 33 representing the red, green, and blue video signals from the video picture source 20 are applied to digital-to-analog converters 61, 62, and 63 respectively. The analog signal produced by the digital-to-analog converter 54 is converted to an analog signal representing the complement of its original value by subtracting the analog signal produced by the digital-to-analog converter 64 from a value representing unity in a differential amplifier 65. Thus the output of the differential amplifier 65 will be an analog signal representing a value between zero and one inclusive corresponding to the complement of the value represented by digital output produced by the weighting transition executor 44. The output signal of the differential amplifier 65 is applied to each of the digital-to-analog converters 61 through 63. The digital-to-analog converters 61 through 63 will each produce an analog output signal representing the value of the digital signals applied by the analog-to-digital converters 61 through 63, respectively, multiplied by the value represented by the analog signal produced by the differential amplifier 65.

The outputs of the digital-to-analog converters 51 and 61 are applied to a summing circuit 71 where they are added together to produce a video output signal representing the video color red. The outputs of the digital-to-analog converters 52 and 62 are applied to a summing circuit 72 where they are added together to produce a video output signal representing the video color green. The output signals of the digital-to-analog converters 53 and 63 are applied to a summing circuit 73, where they are added together to produce a video output signal representing the video color blue.

In operation, when the raster scan is scanning over a portion in the picture to be produced, in which the video picture produced by the source 20 is to be reproduced fully unobscured with no graphic object involved, the output value from the weighting transition executor 44 will be zero. Accordingly the output signal of the digital-to-analog converter 54 will represent zero and the output signal of differential amplifier 65 will represent one. As a result the outputs from the digital-to-analog converters 51 through 53 will be zero and the outputs from the digital-to-analog converters 61 through 63 will represent the full values of the digital outputs from the analog-to-digital converters 31 through 33. As a result the summing circuits 71 through 73 will produce the red, green, and blue video signals produced by the video picture source 20. When the raster scan is scanning over an opaque graphic object or over transitions between opague graphic objects, the output value from the weighting transition executor 44 will be one. As a result the output of the digital-to-analog converter 54 will represent a value of one and the output of the differential amplifier 65 will represent a value of zero. Accordingly, the digital-to-analog converters 61 through 63 will produce zero analog outputs and a digital-to-analog converters 51 through 53 will produce analog outputs representing the full values of the digital values produced by the transition executors 41 through 43 respectively. Thus, the summing circuits 71 through 73 will produce video signals representing the digital output values from the transition executors 41 through 43 respectively.

When the raster scan is scanning across a transition, between a fully unobscured camera picture and a graphic object, whether it be an opaque graphic object or a partially transparent graphic object, the values of the outputs from the transition executors 41, 42, and 43 will represent the brightness values of the red, blue, and green colors in the graphic object to or from which the transition is taking place. The output value of the transition executor 44 will be changing in steps from its beginning weighting value to its final weighting value across the transition. If the transition is from the camera picture to the graphic object, the beginning weighting value from the transition executor 44 will be zero and will change in steps to the final weighting value representing the opacity of the graphic object. As a result, at the start of the transition from a camera picture to a graphic object, the outputs of the digital-to-analog converters 61 through 63 will reproduce the full values of the video signals produced by the video picture source 20 and the output of the digital-to-analog converters 51 through 53 will be zero so that the outputs of the summing circuits 71 through 73 will correspond to the video signal produced by the video picture source 20. At the end of a transition from a video camera picture to a graphic object, the outputs of the digital-to-analog converters 61 through 63 will represent the red, green, and blue video signals multiplied by the complement of the final weighting value from the transition executor 44 and the outputs of the digital to analog converters 51, 52 and 53 will represent the red, green, and blue brightnss values of the graphic object multiplied by the final weighting value.

The summing circuits 71 through 73 accordingly produce outputs representing the brightness values of the graphic object mixed with the video picture camera signals in accordance with the opacity of the graphic object. If the final weighting value is one, then the outputs of the digital-to-analog converters 61 through 63 will be zero and the outputs of the digital-to-analog converters 51 through 53 will fully represent the video color signals at the end of the transition. As the weighting value produced at the output of the weighting transition executor 44 increases in steps across the transition from the camera picture to the graphic object, the output signals from the digital-to-analog converters 51 through 53 will increase toward the multiple of the final weighting value and the graphic object brightness values produced at the outputs of the transition executors 41 through 43. At the same time the outputs of the digital-to-analog converters 61 through 63 will decrease toward the multiple of the complement of the final weighting value times the red, green, and blue video signals. As a result, the summing circuits 71 through 73 mix the red, green and blue video signals from the picture source 20 with the graphic object brightness values from the transition executors 41 through 43 in the transition with the amount of the video picture signals decreasing across the transition from a fully unobscured camera picture to a graphic object and the amount of the final brightness values increasing across the transition.

When the transition is from a graphic object to a fully unobscured video camera picture, the same thing happens in the reverse. In this latter kind of transition, the weighting value produced by the transition executor 44 changes from an initial value corresponding to the opaqueness of the graphic object to zero across the transition. The brightness outputs from the transition executor 41, 42 and 43 will be the brightness values of the graphic object from which the transition is taking place. As a result of the changing value of the weighting value from the transition executor 41 in the transition, the summing circuits 71 through 73 will mix increasing amounts of the video signals from the source 20 and decreasing amounts of the brightness values from the transition executors 41 through 43. Since at the end of the transition from the graphic object to the video camera picture, the weighting value output of the transition executor 44 will be zero, the summing circuits 71 through 73 will represent the full values of the video signals produced by the video picture source 20 and will have zero components from the transition executors 41 through 43 at the end of the transition.

In the manner described above the circuitry of FIG. 4 in transitions between a fully unobscured camera picture and a graphic object, causes the video signal to change in steps across the transition between values corresponding to the video picture and values corresponding to the graphic object. Because of the gradual change achieved in this manner across the transition, the graphic objects are displayed with a high degree of smoothness and quality and with reduced distortion due to aliasing.

The operation of the system has been described for transitions between opaque graphic objects and transitions between a fully unobscured camera picture and a graphic object, which may be opaque or translucent, in which case the partially obscured camera picture is visible through the graphic object. The system will also produce transitions between translucent graphic objects or between a translucent graphic object and an opaque graphic object. The transition specification for such an opaque graphic object. The transition specification for such a transition will have the same data in slots 1 through 7, 8r, 8g, 8b, 9r, 9g, and 9b, that is found in these slots in a transition specification for a transition between opaque graphic objects. In addition, in slots 10, 11, and 12 the same data will be found that is found in the transition specification for a transition from a fully visible camera picture to a graphic object. As a result the transition executors 41 through 43 will operate in the same manner as in transitions between opaque graphic objects and the weighting transition executor 44 will operate in the same manner as in a transition from a fully visible camera picture to a graphic object except that the beginning weighting value, existing at the output of the transition executor 44 at the start of the transition, will not be zero but will correspond to the opacity of the graphic object from which the transition is going. Thus in a transition between graphic objects at least one of which is translucent, the brightness values at the outputs of the transition executors 41 through 43 will change in steps from the brightness values for the graphic object from which the transition is going to the brightness values for the graphic object to which the transition is going. The weighting value produced by the weighting transition executor 44 in such a transition will change in steps from the beginning weighting value representing the opacity of the object from which the transition is going to the weighting value of the graphic object to which the transition is going. As a result, the summing circuits 71 through 73, in transitions between graphic objects at least one of which is translucent, will produce video signals to cause the graphic object colors to gradually change from that of the object preceding the transition to that of the object succeeding the transition and to cause the opacity of the mixture of the graphic object colors in the transition to gradually change from the opacity of the object preceding the transition to the opacity of the object succeeding the transition. In this manner such transitions are represented with high quality in a high degree of smoothness and with reduced distortion due to aliasing.

The timing section 35 is similar to that disclosed in U.S. Pat. No. 4,482,893 except that the counters which determine the position of the raster scan for the video signals produced by the digital to analog converters 51 through 53 are synchronized with the raster scan for the video signals produced by the video picture source and accordingly with the video signals produced by the digital-to-analog converters 61 through 63.

Figure 5:
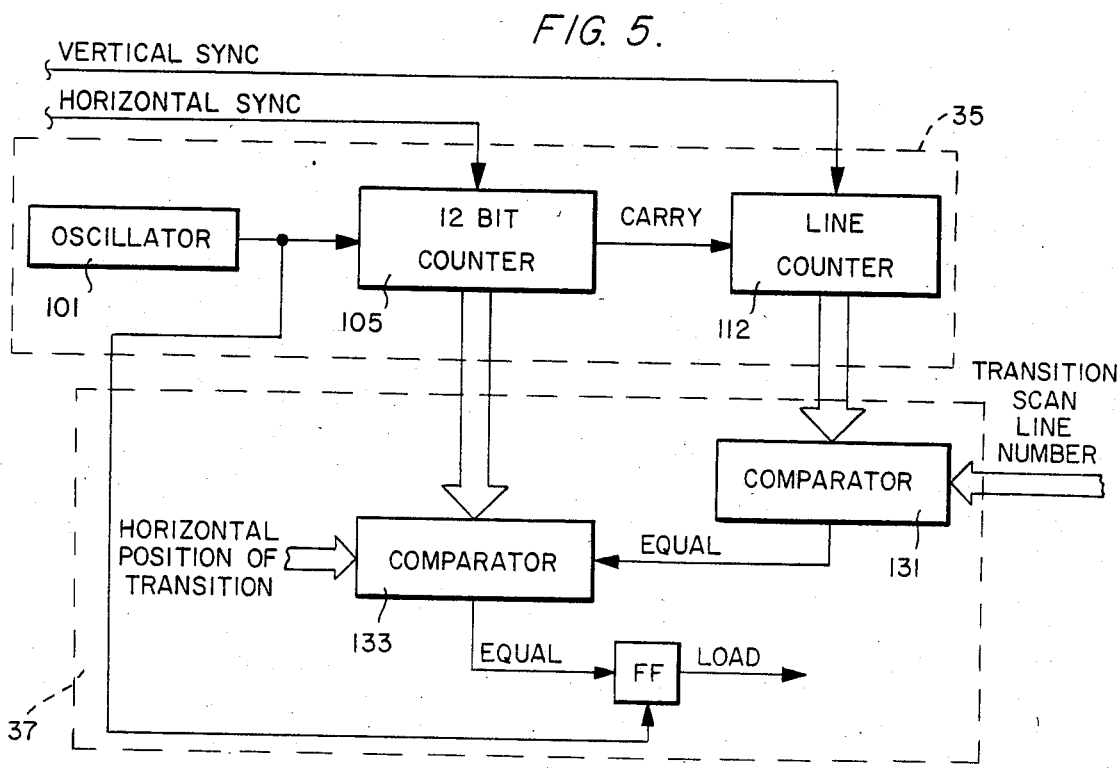
FIG. 5 is a block diagram illustrating the timing section and position trigger blocks of FIG. 4 in more detail.

The timing section 35, as shown in more detail in FIG. 5, comprises a 64 megahertz oscillator 101, the output of which is applied to a twelve bit counter 105. The counter 105 provides a multibit binary signal representing the horizontal position in the raster scan for the video output signals to be produced by the digital-to-analog converters 51, 52 and 53. The twelve bit counter 105 also generates a carry pulse at the end of each sweep of a horizontal line in the raster scan, which carry pulse is applied to and counted by a line counter 112. The count in the line counter 112 continuously represents the line currently being scanned in the raster scan for the video signals being produced by the digital-to-analog converters 51 through 53 and the line counter 112 produces binary signals representing this value. The horizontal and vertical sync pulses produced by the video camera picture source 20 are applied to the counters 105 and 112 respectively to reset these counters and thus maintain the counts in these counters synchronized with the raster scan for the video signals being produced by the video picture source 20.

As shown in FIG. 5, the binary output signals of the counters 112 and 105 are applied to comparators 131 and 133 in the position trigger 37, which is identical to the position trigger in the above-mentioned U.S. Pat. No. 4,482,893. The comparator 131 also receives the multibit binary signal from memory slot 3 of the transition specification currently being read out from the the graphic display memory 19. This value represents the horizontal scan line number on which occurs the transition represented by the transition specification next to be generated by the video display device 13. When the count in the counter 112 equals the video scan line number applied to the comparator 131 from the graphics display memory, the comparator 131 upon detecting this equality will provide an enabling signal to the comparator 133. The comparator 133 receives signals applied thereto from the graphics display memory from memory slot 4 of the transition specification representing the horizontal position in the raster scan line of the transition specification. When the count in the counter 105 equals the horizontal position represented by the signals received from the graphics display memory 19, this will mean that the position in the raster scan for the video signals being produced by the digital-to-analog converters 51 through 53 is at the start position specified for the transition in the transition specification currently being read out from the graphics display memory 19 and the comparator 133 will generate a signal to enable a flip flop 135. On the next system clock signal generated by the oscillator 101 in the timing section, the flip flop 135 will generate the load pulse, which is applied to the transition executors 41 through 44. As explained above, in response to this load pulse the transition executors 41 through 43 load the step count value in memory slot 6 from the transition specification currently being read out of the graphics display memory 19 and thw weighting transition executor 44 will load the step count value in memory slot 12 in the transition specification currently being read out from the graphics display memory 19.

Figure 6:
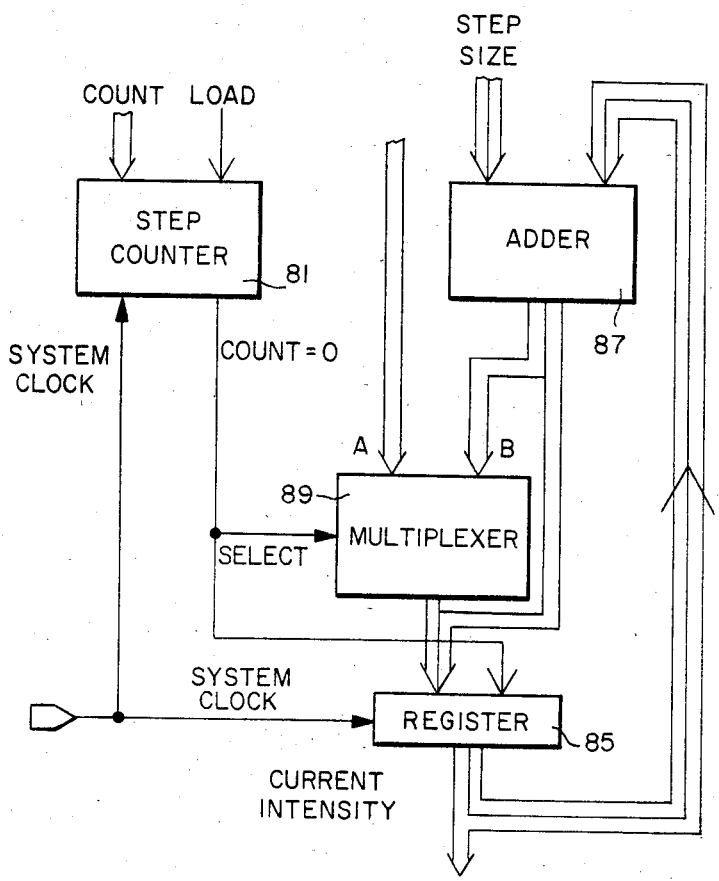
FIG. 6 is a block diagram illustrating one of the transition executor blocks of FIG. 4 in more detail.

The circuitry of the transition executors 41 through 44 is identical to that of the transition executors as disclosed in the above-mentioned U.S. Pat. No. 4,482,893. As shown in FIG. 6, each transition executor comprises a step counter 81 which is designed to receive signals representing a step count from either memory slot 6 or memory slot 12 of the transition specification currently being read out of the graphic display memory 19, depending upon whether the transition executor is a video color transition transition executor 41 through 43 or the weighting transition executor 44. The load pulse applied to the transition executor by the position trigger 37 is applied to the step counter 81 and when the load pulse is applied, the value represented by the binary signals applied to this step counter 81 from the graphics display memory 19 is loaded into the step counter 81. The transition executor also comprises an adder 87 which is designed to receive a 16 bit binary number representing step size. In transition executors 41 through 43 the binary number will be received from memory slots 9r, 9g and 9b in the transition specification currently being readout from the graphics display memory 19. The adder 87 in the weighting transition executor 44 will receive the binary number from memory slot 11. The transition executors each include a multiplexer 89. This multiplexer in the red, green and blue transition executors 41 through 43 will receive the values from memory slots 8r, 8g and 8b respectively, and in the weighting transition executor 44, the multiplexer 89 receives the value from memory slot 10 in the transition specification currently being readout of the graphics display memory.

The adder 87 is a 16 bit adder and the 8 most significant bits in the adder 87 are applied to the multiplexer 89. The multiplexer 89 is controlled by a signal from the step counter 81. When the step counter 81 contains a count greater than zero it will apply a signal to the multiplexer 89 to cause it to select the signals received from the adder 87 and apply them to the eight most significant bit positions of a register 85. When the step counter 81 contains a count of zero it causes the multiplexer 89 to apply the value received from the graphics display memory 89 to the eight most significant bit positions of the register 85. The register 85 is a 16 bit register and the value stored therein is applied to the adder 87 where it is added to the 16 bit value received by the adder 87 from the graphics display memory 19. The adder 87 continuously applies the eight most significant bits of the sum determined from the value applied from the graphic display memory and the value applied from the register 85 to the multiplexer 89 and the eight least significant bits of the sum determined by the adder 87 are applied to the eight least significant bit positions in the register 85.

Clock pulses at a rate of 64 megahertz derived from the oscillator 101 in the timing section 35 are applied to the register 85 and to the step counter 81. Each time the register 85 receives a clock pulse it will store the bits received from the multiplexer 89 in the eight most significant bit positions of the register 85, and if the count in the counter 81 is not zero, will store the bits of the eight least significant bit positions from the output of the adder 87 in the eight least significant bit position of the register 85. Thus if the count in the counter 81 is not zero, the 16 bit output of the adder 87 will be stored in the register 85 in response to each clock pulse. If the count in the counter 81 is zero, then when the next clock pulse is applied to the register 85, the output signal from the counter 81 will set eight least significant bit positions in the register 85 to zero. Thus when the count in the step counter 81 is zero, the eight bit value applied to the multiplexer 89 from the graphics display memory 19 will be stored in the eight most significant bit positions of the register 85 and the eight least significant bit positions of the register 85 will be set to zero.

The counter 81 decrements in response to each applied clock pulse and thus will count down toward zero as the clock pulses are received. The output of the register 85 is the output of the transition executor and is applied from the transition executors 41 through 44 to the digital-to-analog converters 51 through 54 respectively.

When the transition specification currently being readout of the graphics display memory 19 represents a transition between opaque graphic objects, the step count applied to the step counter 81 in each of the transition executors 41 through 43 will be a value, received from memory slot 6 of the transition specification, representing the width of the transition. The 16 bit value applied to the adder 87 from the graphics display memory 19 will be the step size from the corresponding memory slot 9r, 9g, or 9b and will represent the average amount that the brightness for the video color is to increase per horizontal division of the transition. The eight bit value applied to the multiplexer 89 from the graphics display memory will be from a corresponding memory slot 8r, 8g and 8b and will represent the final brightness for the video color at the end of the transition or in other words, the brightness of the graphic object to which the transition is going. Before a load pulse is received the value stored in the register 85 will be the final brightness from the previous transition specification last readout from the display memory. When the next transition specification is read out from the graphics display memory, the adder 87 adds the step size from memory slot 8r, 8g, or 8b to the value in register 85 and the sum of the two applied values are applied to the multiplexer 89 by the adder 87. As indicated above, as soon as the load pulse is applied to the step counter 81, the step count is loaded into the counter 81 and accordingly the count immediately after the load pulse at the start of the transition would usually not be zero. Thus the multiplexer 89 will begin applying the output of the adder 87 to the register 85. When the next clock pulse is received by the register 85, it will cause the 16 bit value from the adder 87 to be stored in the register 85. And at the same time the counter 81 will count this clock pulse to begin counting down toward zero. Thus the value stored in the register 85 will become the previous final brightness plus the added step size. Then with each additional clock pulse, the value in the register 85 will be changed by the step size until the count in the counter reduces to zero, whereupon the counter 81 will cease counting and will apply a signal to the multiplexer 89 to cause it to select the final brightness value applied from the graphics display memory and store this value in the register 85. In this manner the value in the register in 85 is changed in steps from the final intensity of the previous transition to the new final intensity of the current transition.

When a transition between opaque graphic objects has no width, as when the edge is vertical to be perpendicular to the horizontal scan line, the step count that is loaded into the counter 81 in each of the transition executors 41 through 43 in response to the load pulse is zero, and accordingly, the next clock pulse will cause the new final brightness applied to the multiplexor 89 to be loaded into the register 85. In this manner, in the instance of a transition between opaque graphic objects with zero transition width, the brightness value is changed immediately to its new value at the horiztonal position of the transition.

In the case of a transition from a fully unobscured camera picture to a graphic object, the memory slot 6 of transition specification readout from the graphic display memory will contain zero, so in this case also, zero will be loaded into the step counter 81 of the transition executors 41 through 43 in response to the load pulse. The brightness value applied to the multiplexer 89 will be the final video color brightness value in the corresponding slot 8r, 8g, or 8b in the transition specification and accordingly in this kind of transition, the graphic object brightness value will be loaded into the register 85 immediately after the load pulse is applied to the step counter 81. Similarly in the case of a transition from a graphic object to a fully unobscured camera picture, the value in memory slot 6 of the transition specification will be zero, and zero will therefore be loaded into the step counter 81 when this transition specification is readout and the load pulse is applied to the step counter. In this case the value applied to the multiplexer 89 from the graphic display memory will be the video color brightness value of the graphic object from which the transition is going in the corresponding one of the slots 8r, 8g, or 8b. Accordingly, when such a transition specification is readout and the load pulse is applied to the step counter 81, this video color brightness value will be stored in the register 85 on the next applied clock pulse. In this manner the outputs of the transition executors 41,42 and 43 are caused to switch to the video color brightness value of the graphic object to or from which the transition is going at the time the load pulse is applied to the transition executors from the position trigger.

In the weighting transition executor 44, in the case of a transition specification between opaque graphic objects, the value applied to the step counter 81 will be zero coming from memory slot 12 of the transition specification, the value applied to the adder 87 from the graphic display memory will be zero coming from memory slot 11, and the value applied to the multiplexer 89 from the graphic display memory will be equal to one coming from memory slot 10. Upon the load pulse being applied to the weighting transition executor, the value zero will be stored in the step counter 81 and upon the next clock pulse the value one will be stored in the register 85. When a transition is between opaque graphic objects, the value stored in the register 85 in the weighting transition executor from the previous transition will be one, so the value in the register 85 of the weighting transition is maintained at one throughout a transition between opaque graphic objects and stays at one following such a transition.

In the case of a transition from a fully unobscured camera picture to a graphic object, the value already stored in the register 85, of the weighting transition executor 44 at the start of the transition will be zero representing complete transparency. In the case of a transition from a graphic object to a fully unobscured camera picture, the value already stored in register 85 of the transition executor 44 will represent the opacity of the graphic object. When the load pulse is applied, the step count corresponding to the width of the transition from memory slot 12 of the transition specification currently being readout of the graphics display memory will be stored in step counter 81. The weighting step size will be applied to the adder 87 from memory slot 11 and the final weighting value is applied to the multiplexer 89. The weighting transition executor will then operate in response to each clock pulse to change the amount in the register 85 by the amount the weighting step size applied to the adder 87 until the count in the counter 81 reaches zero whereupon the final weighting value will be stored in the register 85. In this manner the output weighting value of the weighting transition executor 44 is caused to change in steps from the beginning weighting value to the final weighting value across the transition involving a camera picture.

In the case of a transition between graphic objects, at least one of which is translucent, the transition executors 41 through 43 will operate in the same manner as described above for a transition between opaque graphic objects and the transition executor 44 will operate in the same manner as for a transition between a fully unobscured camera picture and a graphic object except that neither the beginning weighting value nor the final weighting value will be zero.

As in the above-mentioned U.S. Pat. No. 4,482,893, the step size applied to the adder 87 and the value computed in the register 85 is represented by a 16 binary bit number. However, only the eight most significant bits are applied to the digital to analog converter and converted into an analog signal, and accordingly, only eight bit digital-to-analog converters are required. Changes in values in the register 85 represented with higher precision would not be noticeable. However, by representing the step size with a precision of 16 binary bits and computing the value in the register 85 to 16 binary bits, the step change per horizontal division of a scan line can be made to have an average value closely approximating the value of the step size as precisely represented by the 16 binary bits.

In the above described system of the invention, the address of each transition is absolutely defined in the transition specification for the transition. Another way of defining the position of each transition is to employ a technique called "run length encoding". In this technique the position of each succeeding transition, instead of being determined by data in the transition specification for the transition, is determined by a value put into the preceeding transition specification which tells the system how far to go to the next transition. It will be understood that the electronics of the system could be readily modified to incorporate run length encoding to define the position of the next transition instead of using the technique employed in the system as disclosed.

The above description is of a preferred embodiment of the invention and many modifications may be made thereto without departing from the spirit and scope of the invention, which is defined in the appended claims.

What is claimed is:

1. A video display system for displaying a graphic object over a camera picture comprising a camera picture source of a first video signal representing a camera picture, a display means having a display screen and operable to produce an image on said display screen in a raster scan of said display screen and in response to an applied video signal, a memory, means to store data in said memory representing a graphic object to be displayed over said camera picture by said display means, said data identifying each edge point on said graphic object where said raster scan crosses the edge of said object in the display thereof by said display means, said data including a variable for each of said edge points varying in accordance with the slope that the edge of said object at such edge point makes with the scan line of said raster scan, and display creation means responsive to said first video signal from said camera picture source and responsive to the data stored in said memory to generate a second video signal and apply said second video signal to said display means to cause said display means to display the object represented by said data over said camera picture, said display creation means causing said second video signal to undergo a transition between said first video signal and a third video signal representing said graphic object at each of said edge points with the width of the transition varying in accordance with the slope that the object edge makes with the raster scan line at such edge point, said display means generating said second video signal within said transitions by mixing changing amounts of said first video signal with changing amounts of said third video signal.

2. A video display system as recited in claim 1 wherein said display creation means is operable to generate said second video signal to cause said display means to display said graphic object translucently with said camera picture visible through said graphic object by mixing a portion of said first video signal with a portion of said third video signal to generate said second video signal when said raster scan traverses said graphic object.

3. A video display system as recited in claim 1 wherein said third video signal is at a fixed level when said raster scan traverses said graphic object and is at a zero level when said raster scan traverses a portion of said camera picture unobscured by any graphic object.

4. A video display system as recited in claim 1 wherein said camera source generates a first set of color video signals to represent said camera picture in color, said display creation means generates a second set of color video signals to represent a graphic object in color over said camera picture in color, and said display means displays said graphic object in color over said camera picture in color in response to said second set of video signals.

5. A video display system as recited in claim 1 wherein said display creation means decreases the component of said first video signal in said second video signal and increases the amount of said third video signal in said second video signal when said raster scan is traversing a transition from a camera picture to a graphic object and increases the component of said first video signal and decreases the component of said third video signal in said second video signal when said raster scan is transversing a transition from said graphic object to said camera picture.

6. A video display system as recited in claim 5 wherein said display creation means changes the component of said first video signal and said third video signal in said second video signal in steps when said raster scan is traversing a transition between a camera picture and a graphic object.

7. A video display system as recited in claim 1 wherein said display creation means comprises weighting computing means to continuously determine a weighting value varying in accordance with the opacity ranging between a first value for fully transparent a second value for opaque, said weighting value having said first value when said raster scan is traversing a portion of said camera picture unobscured by any graphic object, having a value corresponding to the opacity of said graphic object when said raster scan is traversing said graphic object, and when said raster scan is traversing a transition between said graphic object and said camera picture having a value which changes from its value at the beginning of the transition to its value at the end of the transition, said display creation circuitry further comprising means to mix said first video signal with said third video signal to produce said second video signal in accordance with said weighting value.

8. A video display system as recited in claim 7 wherein the scan lines of said raster scan are each divided into a multiplicity of scan line divisions and wherein said weighting value computing means changes said weighting value in transitions by adding a step size value to said weighting value at each of said scan line divisions in the transition, said step size value being equal to the final weighting value at the end of the transition minus the beginning weighting value at the start of the transition divided by the number of scan line divisions in said transition.

* * * * *

UNITED STATES PATENT AND TRADEMARK OFFICE
CERTIFICATE OF CORRECTION

PATENT NO. : 4,591,897
DATED : May 27, 1986
INVENTOR(S) : Steven D. Edelson

It is certified that error appears in the above-identified patent and that said Letters Patent are hereby corrected as shown below:

Column 9, line 57, "produce" should be --reproduce--.

Column 11, line 37, "produce" should be --reproduce--.

Column 11, lines 39-41, delete "an opaque graphic object. The transition specification for such".

Column 13, line 10, "thw" should be --the--.

Signed and Sealed this

Twenty-second Day of September, 1987

Attest:

DONALD J. QUIGG

Attesting Officer     Commissioner of Patents and Trademarks